United States Patent
Kaminski et al.

(10) Patent No.: US 7,433,707 B2
(45) Date of Patent: Oct. 7, 2008

(54) TELECOMMUNICATION METHOD SUPPORTING MULTIPLE AIR INTERFACES

(75) Inventors: Stephen Kaminski, Eislingen (DE); Hajo Bakker, Eberdingen (DE); Bernd Haberland, Stuttgart (DE)

(73) Assignee: ALCATEL, Paris (FR)

( * ) Notice: Subject to any disclaimer, the term of this patent is extended or adjusted under 35 U.S.C. 154(b) by 610 days.

(21) Appl. No.: 10/699,687

(22) Filed: Nov. 4, 2003

(65) Prior Publication Data
US 2004/0116153 A1    Jun. 17, 2004

(30) Foreign Application Priority Data
Dec. 16, 2002    (EP)    .................... 02360350

(51) Int. Cl.
H04M 1/00 (2006.01)
H04Q 7/20 (2006.01)
H04B 7/00 (2006.01)

(52) U.S. Cl. ............... 455/552.1; 455/432.1; 455/452.2; 455/525

(58) Field of Classification Search .............. 455/552.1, 455/435.1–435.2, 432.1–432.2, 452.2, 524–525
See application file for complete search history.

(56) References Cited

U.S. PATENT DOCUMENTS

| | | | |
|---|---|---|---|
| 5,412,375 A * | 5/1995 | Wood | 455/451 |
| 6,169,898 B1 * | 1/2001 | Hsu et al. | 455/432.3 |
| 6,546,246 B1 * | 4/2003 | Bridges et al. | 455/432.1 |
| 6,591,103 B1 * | 7/2003 | Dunn et al. | 455/436 |
| 6,785,556 B2 * | 8/2004 | Souissi | 455/557 |
| 6,799,038 B2 * | 9/2004 | Gopikanth | 455/435.2 |
| 2002/0039892 A1 | 4/2002 | Lindell | |
| 2002/0087674 A1 | 7/2002 | Zhao | |
| 2002/0132636 A1 * | 9/2002 | Stockhusen | 455/553 |
| 2002/0147008 A1 * | 10/2002 | Kallio | 455/426 |
| 2004/0157600 A1 * | 8/2004 | Stumpert et al. | 455/432.1 |
| 2004/0203796 A1 * | 10/2004 | Dunlop et al. | 455/445 |

* cited by examiner

*Primary Examiner*—William Trost
*Assistant Examiner*—Marivelisse Santiago
(74) *Attorney, Agent, or Firm*—Sughrue Mion, PLLC

(57) ABSTRACT

The invention relates to a telecommunication method comprising the steps of: receiving of a required quality of service parameter set from a core network by a radio network controller, selecting a sub-set of air interfaces from a set of air interfaces, the sub-set containing air interfaces, which support the required quality of service parameter set, providing the sub-set to a node of a radio access network having the set of air interfaces, selecting an air interface from the sub-set by the node for providing the required quality of service to a user equipment.

14 Claims, 2 Drawing Sheets

TELECOMMUNICATION METHOD SUPPORTING MULTIPLE AIR INTERFACES

FIELD OF THE INVENTION

The present invention relates to the field of radio access networks, and more particularly without limitation to radio access networks supporting multiple telecommunication standards. The invention is based on a priority application EP 02 360 350.9 which is hereby incorporated by reference.

BACKGROUND AND PRIOR ART

UMTS is a wireless communication method which has been standardized and which is currently being deployed. The corresponding standards, in particular 3GPP TS 25.308 Version 5.2.0, March 2002, and 3GPP TS 25.321 V5.2.0 September 2002, concerning various extension of UMTS, i.e. High Speed Downlink Packet Access (HSDPA) and the MAC protocol specification, respectively, are herein incorporated by reference in their entirety.

Other wireless standards, such as IEEE 802.11 are designed to enable mobile devices, such as mobile telephones, laptop computers, headsets, and PDAs (Personal Digital Assistants), to communicate with each other and a wired LAN (Local Area Network). Such mobile devices are capable of transferring between wireless LANs (WLANs), and some mobile devices can transfer between different types of wireless networks (e.g., a WLAN and a cellular mobile telecommunications network). Such transfers typically require establishing a new connection with the new WLAN for the mobile device making the transfer. These technologies provide for a common attachment approach for different mobile devices, and so enables mobile phones, laptops, headsets, PDAs and other devices to be easily networked in the office and eventually in public locations. Standards, such as the IEEE 802.11 (Institute of Electrical & Electronics Engineers) and ETSI (European Telecommunications Standards Institute) HIPERLAN/2, provide wireless connection function and may be used to support WLAN (wireless LAN) communications. See the IEEE 802.11 "Wireless LAN Medium Access Control (MAC) and Physical Layer Specifications," the entire teachings of which are herein incorporated by reference. See also the ETSI specifications for HIPERLAN/2, such as ETSI document number TR 101 683, "Broadband Radio Access Networks (BRAN); HIPERLAN Type 2; System Overview," the entire teachings of which are herein incorporated by reference.

Some mobile devices also have the capability of moving among different types of wireless communication networks, such as between a WLAN network (Bluetooth or IEEE 802.11, as described above) and a mobile telecommunications network, such as one based on a mobile telephone communication protocol (e.g., CMTS or cellular mobile telephone system, GSM or Global System for Mobile communications, PCS or Personal Communications Services, or UMTS or Universal Mobile Telecommunications System).

For example, the mobile device (e.g., laptop computer or PDA) includes communications interfaces (e.g., communications hardware and software) that allow the mobile device to communicate with two (or more) different types of wireless networks. Typically, when the mobile device moves to access a different type of wireless network, the current communication session with the current wireless network terminates, and the mobile device establishes a new communication session (new communication) with the newly accessed wireless network.

The present invention aims to provide an improved telecommunication method in order to enable improved usage of mobile devices supporting such multiple air interfaces. In particular, the present invention aims to provide an improved radio network controller and an improved node of a radio access network.

SUMMARY OF THE INVENTION

The present invention provides for a radio access controller and a node of a radio access network supporting multiple air interface standards. When an active user equipment is in a zone where there is coverage of two or more air interfaces a selection is made between the available interfaces for the purposes of making more efficient usage of the available bandwidth resources.

For example a high speed downlink packet access (HSDPA) transmission for streaming of data to the end user device has been established. After the transmission has been established, e.g. a bottleneck situation occurs due to requests of other users for telecommunication services. Such a bottleneck situation can be resolved by replacing the physical layer of the HSDPA connection by an alternative physical layer, such as WLAN, and mapping the HSDPA frames onto the WLAN frame structure. This way a seamless change-over between the UMTS and WLAN air interfaces occurs while the HSDPA transmission is maintained. Replacement of the physical layer may also be reasonable due to other reasons, e.g. interference, transceiver failure, or network operator decision.

In accordance with a preferred embodiment of the invention the multiple standards radio network controller receives a quality of service parameter set from the core network. This is part of a request of an active user equipment for telecommunication services. Further the radio network controller receives data from the respective network node, such as a Node B, which indicates the actual availability of air interfaces. For example, one or more of the air interfaces may not be available as the respective bandwidth resources are exhausted.

Further the radio network controller receives a monitoring list from the requesting user equipment indicating the air interfaces the user equipment "sees" from its current location. The combination of the monitoring list from the user equipment and the availability data from the radio access node provides the radio network controller with a set of air interfaces from which a selection can be made.

The radio network controller selects one or more interfaces from this set of air interfaces. For this purpose the radio network controller identifies such air interfaces from the available set of air interfaces which do best match the quality of service requirements. This "list of candidates" is provided from the radio network controller to the radio access node. On the level of the radio access node the final selection from the list of candidates is made. This selection can be made based on a load balancing scheme or based on other criteria.

After the final selection has been made the telecommunication link having the required quality of service is established with the requesting user equipment. When a bottleneck situation occurs the physical layer of the established telecommunication link can be changed by replacing the current air interface by another one. This transition can be made seamlessly without effecting higher layers of the communication. This way a more efficient usage of the combined channel capacities of the multiple standard air interfaces covering the same or overlapping regions can be made.

BRIEF DESCRIPTION OF THE DRAWINGS

In the following preferred embodiments of the invention are described in greater detail by making reference to the drawings in which.

DETAILED DESCRIPTION OF PREFERRED EMBODIMENTS

Figure 1:
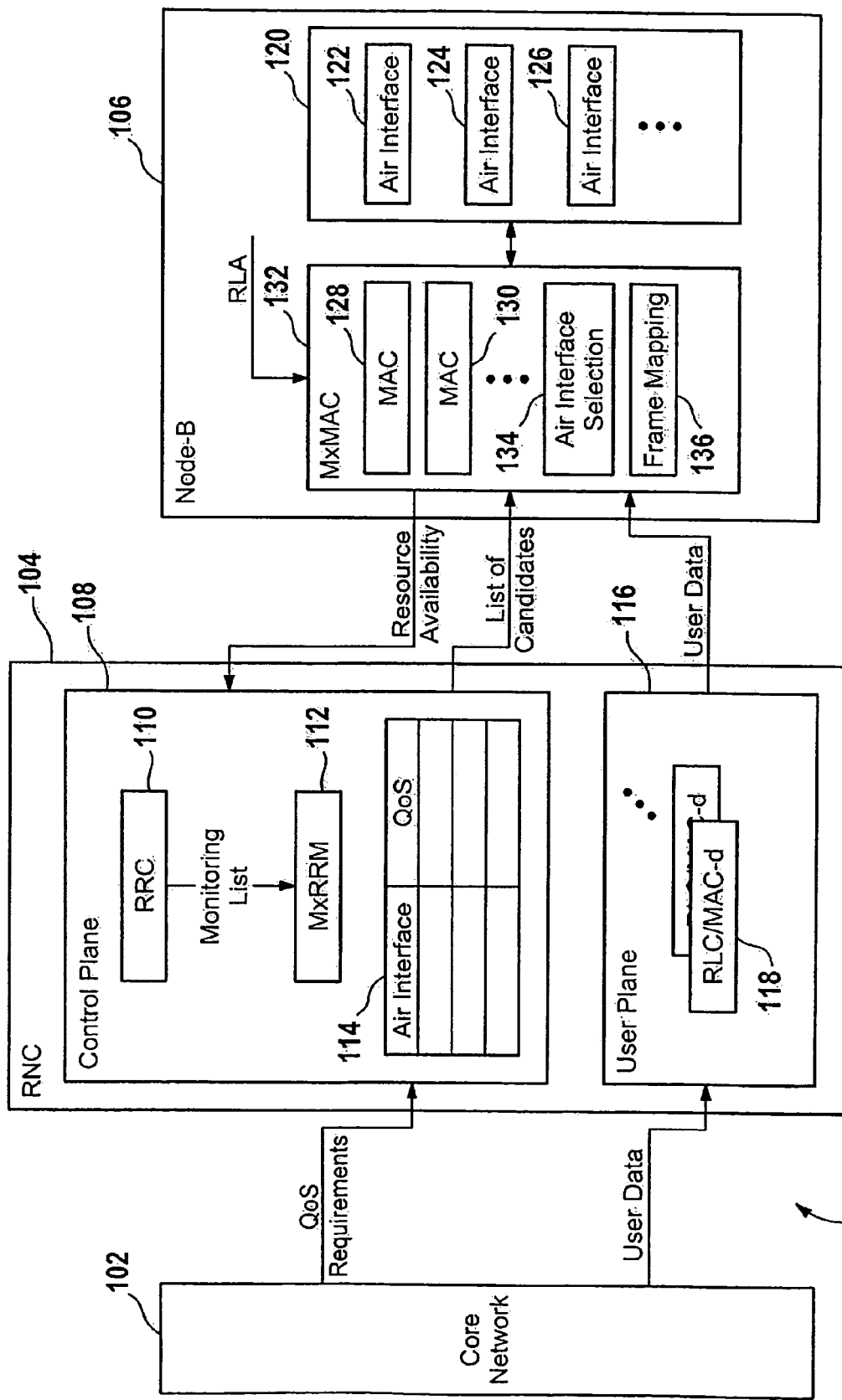
FIG. 1 shows a block diagram of a radio access network comprising an embodiment of a radio network controller and a Node B.

FIG. 1 shows a block diagram of a telecommunication system 100 having a core network 102, a radio network controller (RNC) 104 being coupled to the core network 102 and a number of Node Bs 106 being coupled to radio network controller 104.

RNC 104 has a control plane 108 comprising a radio resource control component 110 and a radio resource management (RRM) component which supports multiple air interface standards. This component will be referred to in the following as MxRRM 112. Control plane 108 contains a list 114 of all air interfaces which are supported by Node B 106. Each of the air interfaces has a quality of service (QoS) information being descriptive of the QoS which can be provided by a given air interface.

Further RNC 104 has user plane 116. User plane 116 has a RLC/MAC-d component 118 for each active communication link. MAC-d is a MAC entity of the MAC sub-layer; for details on the radio link control (RLC)/MAC-d functionality of component 118 reference is made to the corresponding standard definitions, e.g. 3GPP TS 25.321 V5.2.0 (2002-09), Technical Specification, 3rd Generation Partnership Project; Technical Specification Group Radio Access Network; MAC Protocol Specification, (Release 5).

The user data for each of the radio links established via RLC/MAC-d components 118 is provided from core network 102. For the purposes of the transmission of the user data from the core network 102 to user plane 116 a TCP/IP or ATM protocol can be used.

Node B 106 has a set 120 of air interfaces 122,124,126, . . .

For each one of the air interfaces 122, 124, 126 . . . there is a corresponding medium access control (MAC) component, i.e. MAC component 128 for air interface 122, MAC component 130 for air interface 124, . . .

For example air interface 122 is a Tx HSDPA type air interface; air interface 124 is a Tx WLAN type air interface; air interface 126 is a Tx UMTS-FDD air interface. A variety of additional air interfaces can be supported, such as orthogonal frequency division multiplexing (OFDM), Bluetooth and others.

The MAC components 128, 130 . . . receive radio link adaptation (RLA) information for controlling of the respective radio links as it is as such known from the prior art.

All of the MAC components 128, 130, . . . are comprised in MxMAC unit 132 which thus provides MAC functionalities for the various air interfaces 122, 124, 126, . . .

Further MxMAC unit 132 has air interface selection component 134 and frame mapping component 136.

In operation Node B 106 reports the resource availability of the air interfaces contained in the set 120 to the control plane 108 of RNC 104. This way one or more of the air interfaces 122, 124, 126, . . . running at full data transmission capacity are identified. Alternatively those air interfaces 122, 124, 126, . . . which are still available are identified.

When an active user equipment makes a request for telecommunication service the MxRRM 112 receives a corresponding monitoring list from the RRC component 110. The monitoring list contains a list of the air interfaces which the multi-standard user equipment presently "sees". Further control plane 108 receives the quality of service requirements of the request of the user equipment from core network 102.

The monitoring list and the resource availability information in combination define a set of air interfaces contained in list 114 which are available. In this set of available air interfaces a query is made by MXRRM component 112 in order to identify such air interfaces in the set of available air interfaces which best match the quality of service requirements received from core network 102.

The result of that query can be one or more air interfaces which provides a "list of candidates". The list of candidates is provided from control plane 108 to MxMAC 132. Air interface selection component of MxMAC 132 performs a selection of one of the air interfaces contained in the list of candidates. For example this selection can be performed based on a load balancing criterion or another suitable criterion.

For example the user equipment has made a request for streaming of data. The list of candidates contains HSDPA air interface 122 and WLAN air interface 124. When HSDPA air interface 122 is already running close to its maximum capacity and WLAN air interface 124 has relatively little data traffic, air interface selection module 134 as a consequence selects WLAN air interface 124 for the purposes of load balancing. In this instance the streaming data connection with the requesting user equipment is established via air interface 124. Control information from the user equipment to the Node B/RNC can be transmitted simultaneously via air interface 124 or air interface 122.

When a bottleneck situation occurs with respect to a given air interface of the set 120 and other air interfaces of set 120 have unused capacity the physical layers of existing telecommunication links can be replaced. For this purpose frame mapping component 136 maps the data frames of the established telecommunication links to data frames of the alternative physical layer. This way only the physical transport layer is changed but no higher levels of the communication. This way a seamless change-over from one physical layer to another within a zone of overlapping coverage is accomplished. This enables to make full usage of the combined channel capacities of the available air interfaces of set 120 which cover an overlapping zone in which the requesting user equipment is located.

Figure 2:
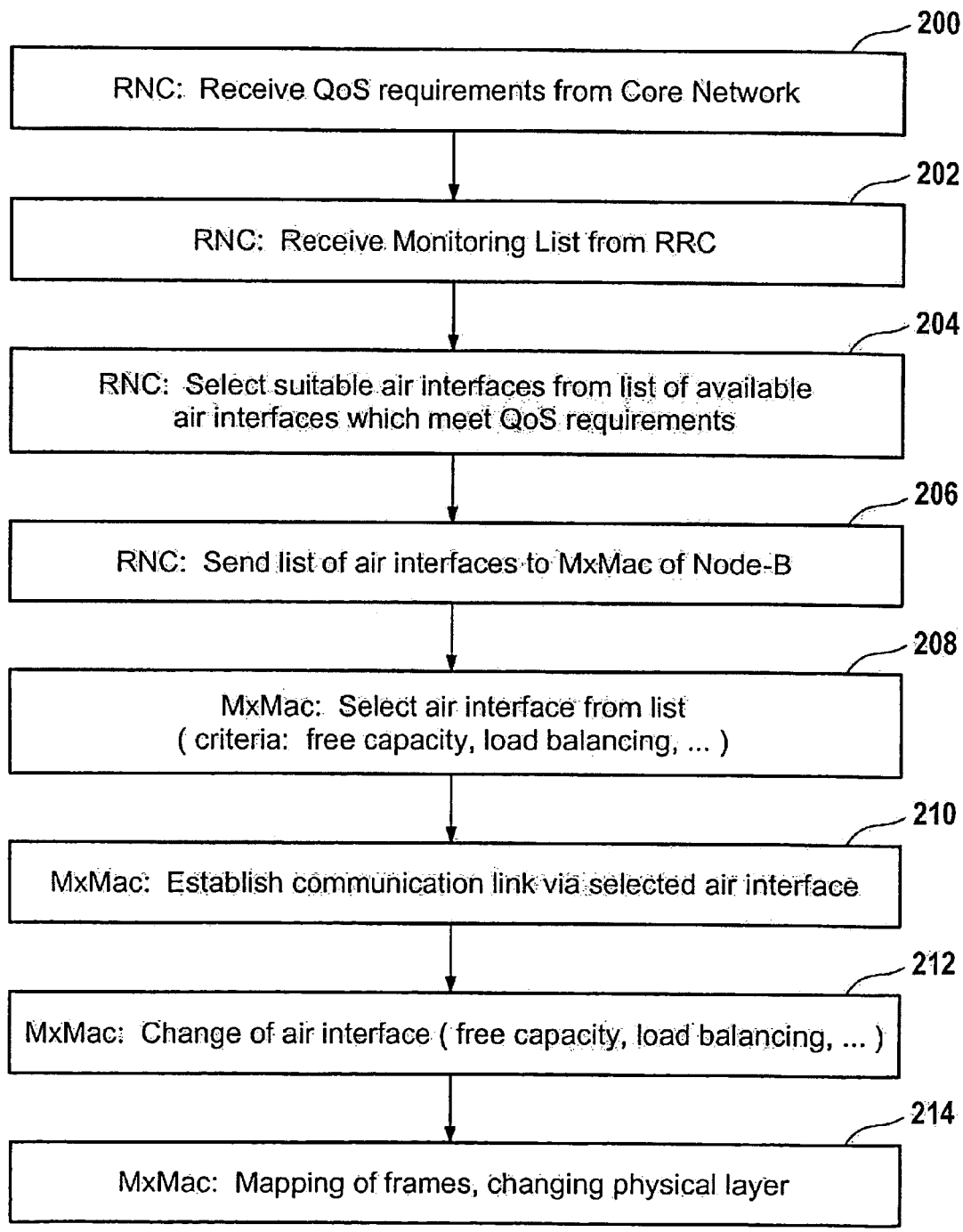
FIG. 2 is illustrative of a flow chart of an embodiment of the present invention.

FIG. 2 is illustrative of a corresponding flow chart.

In step 200 the RNC (cf. RNC 104 of FIG. 1) receives a quality of service request from the core network. Further a monitoring list from RRC is received in step 202. In response RNC selects a suitable list of candidates of air interfaces which best meet the quality of service requirements in step 204. This candidate list is provided to the Node B having a MxMAC as explained with respect to FIG. 1 in step 206.

In step 208 the MxMAC selects an air interface from the list of candidates for example based on a load balancing criterion. In step 210 the communication link is established via the selected air interface. When a bottleneck situation occurs or for improved load balancing the air interface selection component of MxMAC can "on the fly" change the air interface selection by replacing the current physical layer by an alternative physical layer. This is done in step 212. For changing of the physical layers the frames of the established telecommunication link are remapped to the alternative physical layer format. This is done in step 214.

For example in step 210 a HSDPA telecommunication link is established for streaming of data to the requesting user equipment. When the HSDPA capacity becomes scarce a determination is made by the air interface selection component of MxMAC to replace the HSDPA physical layer, i.e. UMTS, by the WLAN physical layer. For this purpose the HSDPA data frames are mapped to WLAN data frames and sent to the user equipment via the WLAN air interface without otherwise effecting the established communication link.

It is to be noted that the above described method can be implemented as an ongoing process. In particular, the control can go back from step 214 to 212 for adaptively changing of the air interface selection.

LIST OF REFERENCE NUMERALS 100 telecommunication system
102 core network
104 radio network controller (RNC)
106 Node B
108 control plane
110 radio resource control (RNC) component
112 MxRRM
114 list
116 user plane
118 RLC/MAC-d component
120 set
122 air interface
124 air interface
126 air interface
128 medium access control (MAC) component
130 medium access control (MAC) component
132 MxMAC unit
134 air interface selection component
136 frame mapping component

The invention claimed is:

1. A telecommunication method comprising the steps of:
receiving a required quality of service parameter set from a core network by a radio network controller,
receiving a monitoring list by the radio network controller, the monitoring list including a set of air interfaces, supported by a node of a radio access network, by which the node can actually establish a telecommunication link with the user equipment, and a quality of service parameter for each air interface in the set of air interfaces,
selecting a sub-set of air interfaces from the set of air interfaces, the sub-set containing air interfaces, which support the required quality of service parameter set,
providing the sub-set to the node having the set of air interfaces,
selecting an air interface from the sub-set by the node for providing the required quality of service to a user equipment.

2. The method of claim 1, further comprising the steps of:
receiving data being indicative of at least one of the air interfaces of the set of air interfaces, the at least one interface having no more free data transmission capacity,
eliminating the at least one air interface from the sub-set.

3. The method of claim 1, whereby the selection of the air interface is performed by the node based on load balancing and/or actual availability of the air interfaces.

4. The method of claim 1, further comprising the steps of:
establishing a first telecommunication link by means of the selected one of the set of air interfaces and sending of data frames having a first data frame format of the selected air interface,
mapping the first data frame format to a second data frame format of an alternative one of the set of air interfaces,
replacing the selected air interface by the alternative interface and sending the mapped data frames having the second air interface format via a second telecommunication link which has been established by means of the alternative air interface.

5. The method of claim 4, the selected air interface being an Universal Mobile Telecommunications System (UMTS) air interface and the first air interface format being High-Speed Downlink Packet Access (HSDPA), the alternative air interface being wireless local area network (WLAN) and the second air interface format being WLAN frames.

6. The telecommunication method according to claim 1, further comprising:
storing said set of air interfaces by the radio network controller;
selecting by the radio network controller the sub-set of air interfaces from said set of air interfaces by referencing a list comprising air interfaces and corresponding quality of service parameters, wherein the list is stored in the radio network controller; and
providing by the radio network controller to the node the selected sub-set of air interfaces.

7. The telecommunication method according to claim 6, further comprising storing, by the node, medium access control components corresponding to respective air interfaces available at the node, wherein said node selects the air interface and maps the selected air interface to a corresponding medium access control component.

8. The telecommunication method according to claim 7, further comprising changing by the node the selected air-interface to another air interface, wherein said another air interface is selected by the node from the provided sub-set of air interfaces without communicating with the radio network controller.

9. The telecommunication method according to claim 1, further comprising the node changing the selected air interface to another air interface selected on the fly from the provided sub-set of air interfaces, wherein said changing further comprises remapping data of the user equipment from a current physical layer to a different physical layer.

10. The telecommunication method according to claim 1, wherein the sub-set of air interfaces comprises at least two air interfaces.

11. A computer-readable medium comprising instructions for performing the operations of:
inputting a required quality of service parameter set which has been received from a core network by a radio network controller,
receiving a monitoring list by the radio network controller, the monitoring list including a set of air interfaces, supported by a node of a radio access network, by which the node can actually establish a telecommunication link with a user equipment, and a quality of service parameter for each air interface in the set of air interfaces,
selecting a sub-set of air interfaces from the set of air interfaces, the sub-set containing air-interfaces which support the required quality of service parameter set,
outputting the sub-set for providing the sub-set to a node of a radio access network having the set of air interfaces for selection of an air interface from the sub-set by the node for providing the required quality of service to the user equipment.

12. A radio network controller of a radio access network comprising:
   means for receiving a required quality of service parameter set from a core network,
   means for receiving a monitoring list, the monitoring list including a set of air interfaces, supported by a node of a radio access network, by which the node can actually establish a telecommunication link with a user equipment, and a quality of service parameter for each air interface in the set of air interfaces,
   means for selecting a sub-set of air interfaces from the set of air interfaces, the sub-set containing air interfaces which support the required quality of service,
   means for providing the sub-set to a node of the radio access network having the set of air interfaces.

13. A node of a radio access network having a set of air interfaces, the node comprising:
   means for transmitting a list of available air interfaces to a radio network controller, the list including a set of air interfaces, supported by the node, by which the node can actually establish a telecommunication link with a user equipment, and a quality of service parameter for each air interface in the set of air interfaces,
   means for receiving a sub-set of air interfaces from a radio network controller of the radio access network,
   means for selecting an air interface from the sub-set for providing a required quality of service to a user equipment, the means for selecting the air interface being adapted to perform the selection based on load balancing and/or current availability of the air interfaces of the sub-set.

14. A telecommunication system comprising a radio network controller having means for receiving a required quality of service parameter set from a core network, means for selecting a sub-set of air interfaces from a set of air interfaces, the sub-set containing air interfaces which support the required quality of service, and means for providing the sub-set to a node of the radio access network having the set of air interfaces, said system further comprising a node of claim 9, the node being coupled to the radio network controller.

* * * * *